(12) United States Patent
Johnson et al.

(10) Patent No.: US 9,650,768 B2
(45) Date of Patent: May 16, 2017

(54) SHOWER VALVE SYSTEM

(71) Applicant: Masco Corporation of Indiana, Indianapolis, IN (US)

(72) Inventors: Brian Wayne Johnson, Muncie, IN (US); Todd Andrew Huffington, Avon, IN (US); Paul Patton, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 14/410,049

(22) PCT Filed: Jul. 12, 2013

(86) PCT No.: PCT/US2013/050238
§ 371 (c)(1),
(2) Date: Dec. 19, 2014

(87) PCT Pub. No.: WO2014/014765
PCT Pub. Date: Jan. 23, 2014

(65) Prior Publication Data
US 2015/0191900 A1     Jul. 9, 2015

Related U.S. Application Data

(60) Provisional application No. 61/672,477, filed on Jul. 17, 2012.

(51) Int. Cl.
*E03C 1/042* (2006.01)
*E03C 1/02* (2006.01)
(Continued)

(52) U.S. Cl.
CPC .............. *E03C 1/042* (2013.01); *E03C 1/023* (2013.01); *E03C 1/0408* (2013.01); *F16L 37/144* (2013.01); *Y10T 137/86566* (2015.04)

(58) Field of Classification Search
CPC ......... E03C 1/042; E03C 1/023; E03C 1/0408
See application file for complete search history.

(56) References Cited

U.S. PATENT DOCUMENTS

| 4,284,078 A | 8/1981 | Pace |
| 4,589,688 A | 5/1986 | Johnson |

(Continued)

FOREIGN PATENT DOCUMENTS

| GB | 1092090 A | 11/1967 |
| JP | 7-255804 A | 10/1995 |

(Continued)

OTHER PUBLICATIONS

International Search Report and Written Opinion mailed Dec. 9, 2013 in related International Application No. PCT/US2013/050238.

*Primary Examiner* — Craig Schneider
*Assistant Examiner* — Kevin Barss
(74) *Attorney, Agent, or Firm* — Faegre Baker Daniels LLP

(57) ABSTRACT

A valve assembly for a shower/tub system is provided. The assembly includes a valve body assembly having a molded base, a first inlet connection fitting configured to fluidly attach a first fluid source to the molded base, a second inlet connection fitting configured to fluidly attach a second fluid source to the molded base, a first outlet connection fitting configured to fluidly attach a shower fixture to the molded base, and a second outlet connection fitting configured to fluidly attach a tub nozzle to the molded base.

24 Claims, 14 Drawing Sheets

(51) Int. Cl.
*E03C 1/04* (2006.01)
*F16L 37/14* (2006.01)

(56) References Cited

U.S. PATENT DOCUMENTS

| | | | |
|---|---|---|---|
| 4,609,007 A | 9/1986 | Uhl | |
| 4,997,007 A * | 3/1991 | Niemann | F16K 11/0856 |
| | | | 137/597 |
| 5,335,943 A | 8/1994 | Duryea | |
| 5,361,802 A | 11/1994 | Kroll et al. | |
| 6,158,918 A | 12/2000 | Orem et al. | |
| 6,206,028 B1 | 3/2001 | Holden | |
| 6,534,003 B1 | 3/2003 | Nguyen | |
| 6,880,565 B2 | 4/2005 | Ouyoung | |
| 7,363,935 B2 | 4/2008 | Anderson et al. | |
| 7,658,420 B2 * | 2/2010 | Harger | F16L 37/0985 |
| | | | 285/314 |
| 7,819,134 B2 * | 10/2010 | Izzy | E03C 1/021 |
| | | | 137/606 |
| 7,823,603 B2 * | 11/2010 | Cochart | F16K 11/00 |
| | | | 137/625.17 |
| 7,992,585 B2 | 8/2011 | Fitzpatrick | |
| 2003/0192116 A1 * | 10/2003 | Burger | E03C 1/023 |
| | | | 4/695 |
| 2004/0124386 A1 | 7/2004 | Carey | |
| 2004/0261864 A1 * | 12/2004 | Coll | E03C 1/023 |
| | | | 137/597 |
| 2005/0127664 A1 | 6/2005 | Arth et al. | |
| 2006/0231140 A1 * | 10/2006 | McNerney | E03C 1/021 |
| | | | 137/360 |
| 2006/0231141 A1 | 10/2006 | Shay | |
| 2010/0147405 A1 * | 6/2010 | Niver | E03C 1/023 |
| | | | 137/625.48 |
| 2011/0100484 A1 * | 5/2011 | Allen | E03C 1/023 |
| | | | 137/359 |
| 2013/0312856 A1 * | 11/2013 | Huffington | F16K 37/00 |
| | | | 137/557 |

FOREIGN PATENT DOCUMENTS

| | | |
|---|---|---|
| JP | 9-042775 A | 2/1997 |
| WO | WO2004034946 A2 | 4/2004 |
| WO | WO2007109729 A2 | 9/2007 |

* cited by examiner

SHOWER VALVE SYSTEM

BACKGROUND AND SUMMARY OF THE INVENTION

The present invention relates generally to a valve system including a plurality of connection adapters and, more particularly, to a shower valve system including a valve body assembly having a molded base supporting connection fittings for fluid coupling with terminal adapters.

Valve bodies including a plurality of connection adapters are known. More particularly, valve bodies for a tub/shower system formed from brass and supporting a valve cartridge are known. Valve bodies may include a mixing valve for controlling the relative amounts of fluids, such as hot and cold water, provided to an outlet fixture, such as a shower head assembly or tub fixture. The valve body fluidly connects fluid supply lines to the mixing valve, and fluidly connects mixed fluid to one or more outlet fixtures.

In the embodiment illustrated in FIGS. 1 and 2, shower outlet terminal adapter 32 and tub outlet terminal adapter 34 are configured to fluidly couple valve body 12 to a first fluid outlet line 37 and a second fluid outlet line 39, respectively. In an illustrative embodiment, first fluid outlet line 37 fluidly attaches to a shower assembly 33, and second fluid outlet line 39 fluidly attaches to a tub spout assembly 35.

According to an illustrative embodiment of the present disclosure, a valve assembly for a shower and tub system includes a valve body assembly having a molded base. A valve cartridge housing is coupled to the molded base, a first connection fitting is molded with the base, a second connection fitting is spaced from the first connection fitting and molded with the base, a third connection fitting is spaced from the second fitting and molded with the base, and a fourth connection fitting is spaced from the third connection fitting and molded with the base. A first inlet terminal adapter is configured to operably couple with the first connection fitting to provide fluid communication between a hot water supply source and the molded base. A second inlet terminal adapter is configured to operably couple with the second connection fitting to provide fluid communication between a cold water supply and the molded base. A first outlet terminal adapter is configured to operably couple with the third connection fitting to provide fluid communication between a shower fixture and the molded base. A second outlet terminal adapter is configured to operably couple with the fourth connection fitting to provide fluid communication between a tub nozzle and the molded base.

According to a further illustrative embodiment of the present disclosure, a valve body assembly includes a valve body configured to be supported within a shower wall, the valve body including a first inlet, a second inlet, a first outlet, and a second outlet, wherein the first inlet is configured to be fluidly connected to a first fluid source and the second inlet is configured to be fluidly connected to a second fluid source. The first outlet is configured to be fluidly connected to a first outlet fixture, and the second outlet is configured to be fluidly connected to a second outlet fixture. A mixing valve is at least partially supported by the valve body configured to combine fluid from the first inlet and second inlet prior to fluid exiting through at least one of the first or second outlets. The valve body includes a molded body providing fluid passageways connecting the first and second inlets to the first and second outlets. A first inlet quick-connect fitting is configured to accept a terminal adapter fluidly connected to the first fluid source, and a first outlet quick-connect fitting is configured to accept a terminal adapter fluidly connected to the first outlet fixture.

According to another illustrative embodiment of the present disclosure, a shower and tub assembly comprises a showerhead, a tub spout, and a valve body assembly fluidly connected to the showerhead and tub spout. A plurality of quick-connect fittings are overmolded with the valve body assembly and define a first fluid inlet and a second fluid inlet. The valve body assembly supports a cartridge configured to mix fluid from the first and second fluid inlets and a molded component providing fluid passageways connecting the showerhead and tub nozzle to the first and second fluid inlets.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
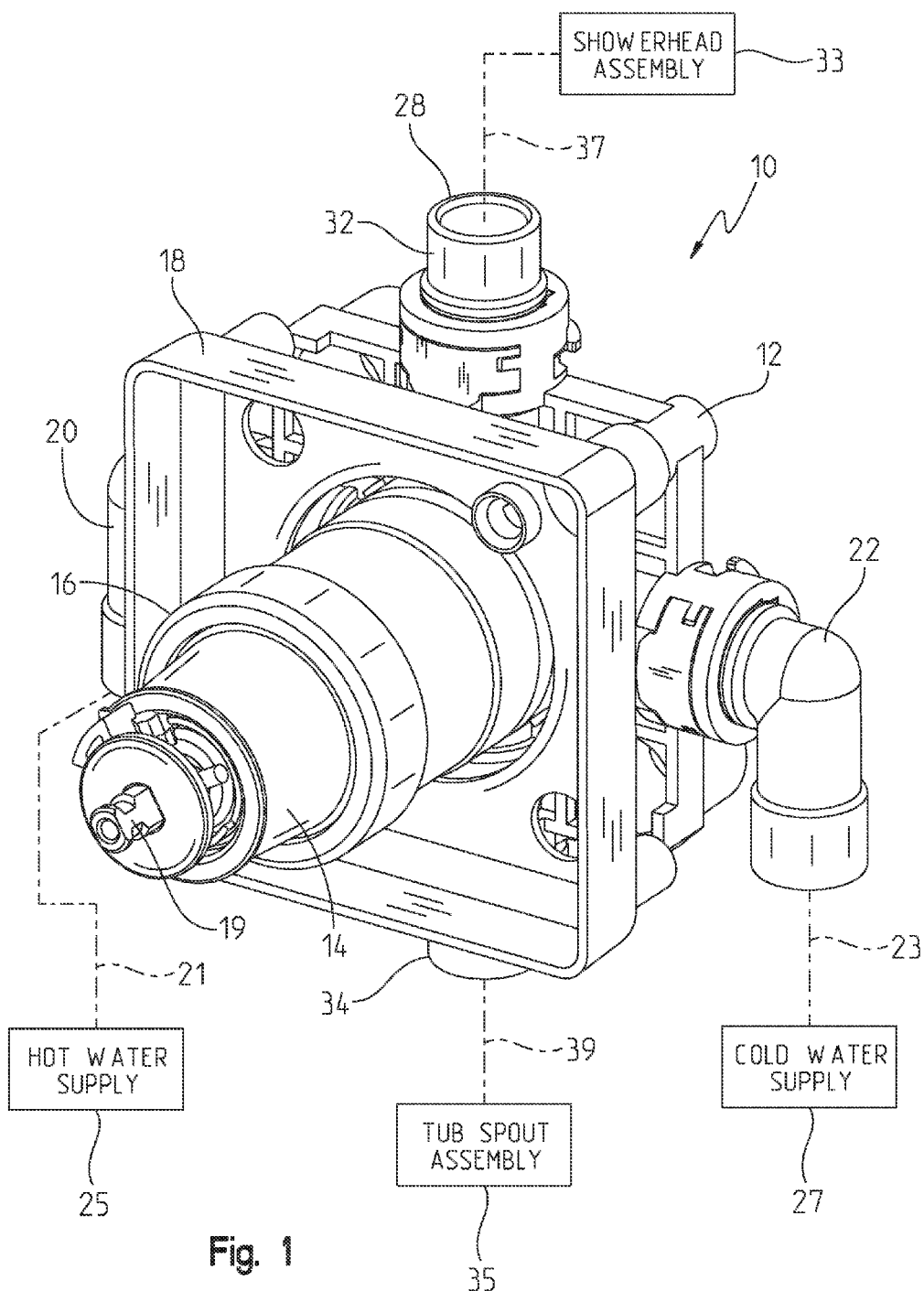
FIG. 1 is a perspective view of an illustrative shower valve system of the present disclosure.
Figure 2:
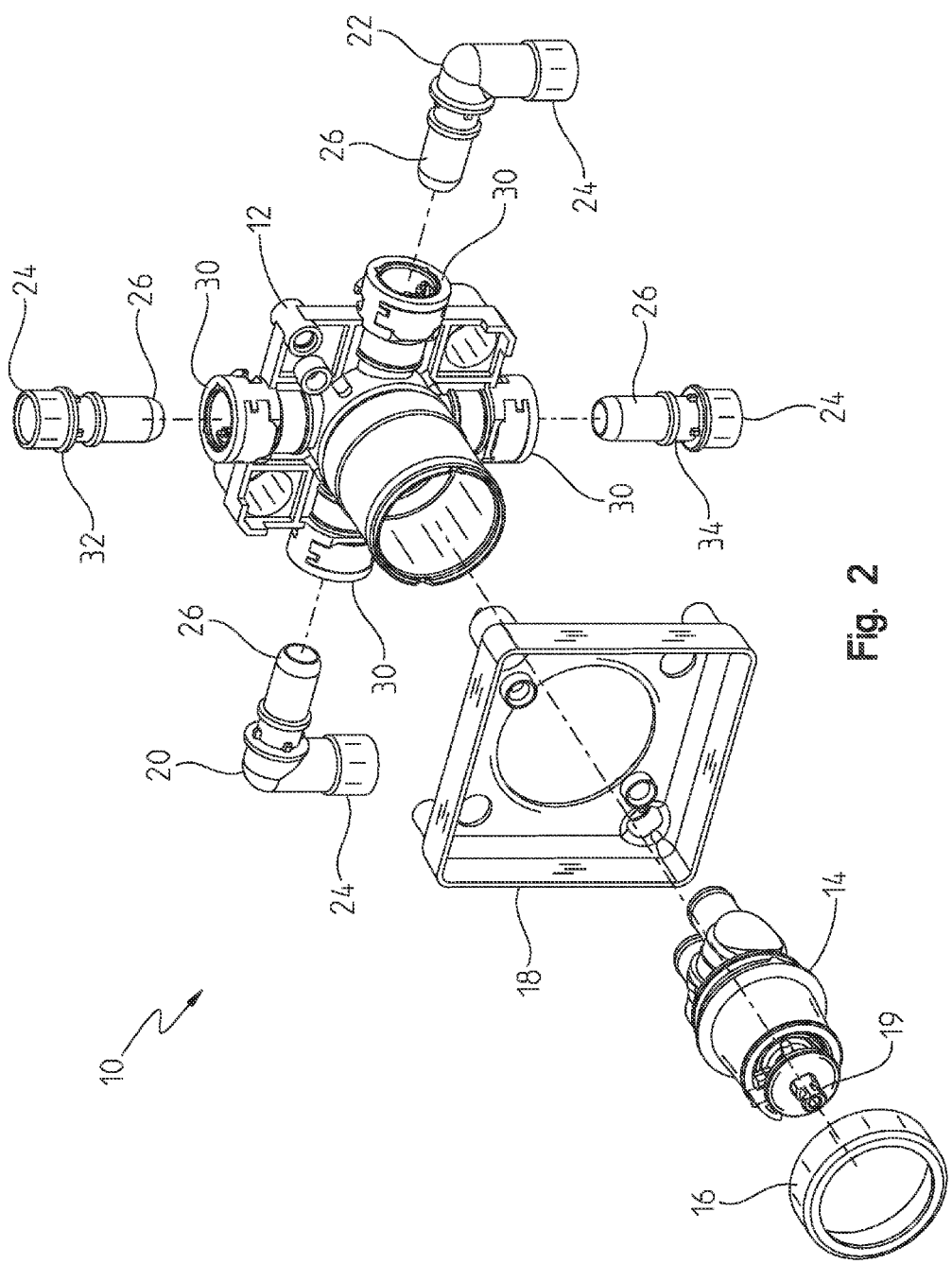
FIG. 2 is an exploded perspective view of the shower valve system of FIG. 1.

Referring initially to FIGS. 1 and 2, an illustrative shower valve system 10 for a tub/shower installation is provided. In the illustrated embodiment, shower valve system 10 includes valve body 12, mixing valve cartridge 14 for adjusting the flow of fluid through valve body 12, and bonnet nut 16 for securing the cartridge 14 to the valve body 12. As is known, a handle (not shown) may be coupled to the stem 19 of the valve cartridge 14 for controlling operation thereof. Plaster guard 18 surrounds valve cartridge 14 and provides access for cartridge 14 to valve body 12 through a wall in which valve body 12 is mounted. An illustrative plaster guard 18 is detailed in U.S. Patent Application Publication No. 2006/0231140, the disclosure of which is expressly incorporated by reference herein.

In the embodiment illustrated in FIGS. 1 and 2, first inlet terminal adapter 20 and second inlet terminal adapter 22 are configured to fluidly attach hot and cold water supply lines 21 and 23 to valve body 12. As illustrated, terminal adapters 20, 22 each include a connection end 24 and a quick-connect adapter end 26 separated by a 90° bend. In another embodiment, terminal adapters 20, 22 do not include a bend, or include a bend other than 90°. Connection end 24 is configured to fluidly couple each terminal adapter 20, 22 to a water supply line 21, 23. In one illustrative embodiment, connection end 24 of first terminal adapter 20 attaches to a hot water supply 25 through hot water supply line 21, and connection end 24 of second terminal adapter 22 attaches to a cold water supply 27 through cold water supply line 23. Hot and cold water supply lines are illustratively tubes formed from conventional material, such as copper, PEX, or CPVC. Quick-connect adapter ends 26 of first and second terminal adapters 20, 22 are each configured to cooperate with a quick-connect fitting 30 attached to valve body 12.

In the embodiment illustrated in FIGS. 1 and 2, shower outlet terminal adapter 32 and tub outlet terminal adapter 34 are configured to fluidly couple valve body 12 to a first fluid outlet line 37 and a second fluid outlet line 39, respectively. In an illustrative embodiment, first fluid outlet line 37 fluidly attaches to a shower assembly 33, and second fluid outlet line 39 fluidly attaches to a tub spout assembly 35. In one embodiment, shower outlet terminal adapter 32 and tub outlet terminal adapter 34 each include a connection end 24 and a quick-connect adapter end 26. In one illustrative embodiment, connection end 24 of shower outlet terminal adapter 32, 32' attaches to a shower riser 36 (see FIGS. 6 and 7) and connection end 24 of tub outlet terminal adapter 34 attaches to a tub-drop assembly outlet line 39. Quick-connect adapter ends 26 of shower outlet terminal adapter 32 and tub outlet terminal adapter 34 are each configured to cooperate with a quick-connect fitting 30 attached to valve body 12.

In one illustrative embodiment, at least one of the connection ends 24 of terminal adapters 20, 22, 32, 34 is molded from chlorinated polyvinyl chloride ("CPVC") to allow for a direct glue point for a CPVC supply line, such as a hot or cold supply line 21, 23, a CPVC pipe 37 attached to a shower assembly 33 (i.e., shower riser), or a CPVC pipe 39 attached to a tub-drop assembly 35 (i.e., tub drop). In another illustrative embodiment, at least one of the connection ends 24 one of terminal adapters 20, 22, 32, 34 is molded from an engineering grade thermoplastic which can be joined to a cross-linked polytheylene ("PEX") supply line 21, 23, a PEX tube 37 attached to an overhead shower assembly 33 (i.e., shower riser), or a cross-link polyethylene (PEX) tube 39 attached to a tub drop assembly 35 (i.e., tub drop). In such an embodiment, the connection ends 24 of terminal adapters 20, 22, 32, 34 are illustratively fluidly coupled to the hot and cold water supply lines 21, 23, the shower riser outlet line 37, or the tub drop outlet line 39 through conventional crimped or expansion connections. Alternatively, an overmold may be used, particularly between the terminal adapters 20, 22 and the water supply lines 21, 23. In still another illustrative embodiment, at least one of the connection ends 24 of terminal adapters 20, 22, 32, 34 is formed from copper or brass to allow for solder or brazing to a copper supply line, such as hot and cold supply lines 21, 23, a copper pipe 37 attached to a shower assembly 33 (i.e., shower riser), or a copper pipe 39 attached to a tub-drop assembly 35 (i.e., tub drop). Other suitable materials for forming terminal adapters and quick-connect adapters may also be used.

In one illustrative embodiment, a user selects a terminal adapter type corresponding to the type of tubing or piping from the supply line or leading to the output fixture. Exemplary tubing and piping types include copper, various forms of PEX tubing, and CPVC pipe. The user is able to select a terminal adapter having the appropriate connection end 24 for the connection to be made at each connection fitting of the valve body 12. In one illustrative embodiment, a user could connect copper pipe at all each connection fitting of the valve body 12. In another illustrative embodiment, the user could connect CPVC to the supply inlets, copper to the tub drop, and PEX to the shower riser. In this illustrative embodiment, the user can connect to the various types of materials without having to purchase a separate valve body 12 for each application.

In another illustrative embodiment, terminal adapters may include stops (not shown). The stops include valves that allow the fluid supply to be shut off at the valve in the terminal adapter, rather than at the main source.

Figure 3:
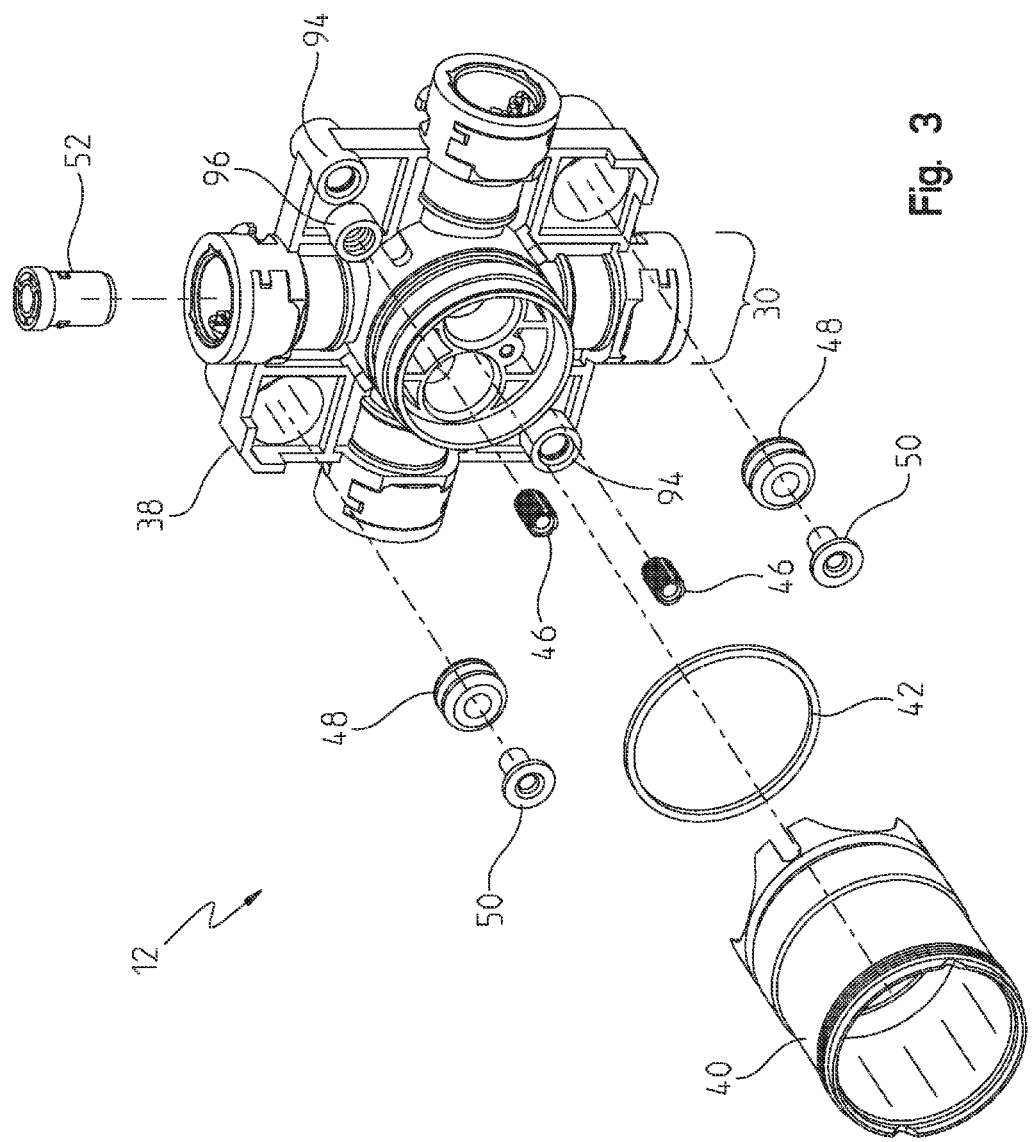
FIG. 3 is an exploded perspective view of the valve body assembly of FIG. 1.
Figure 4:
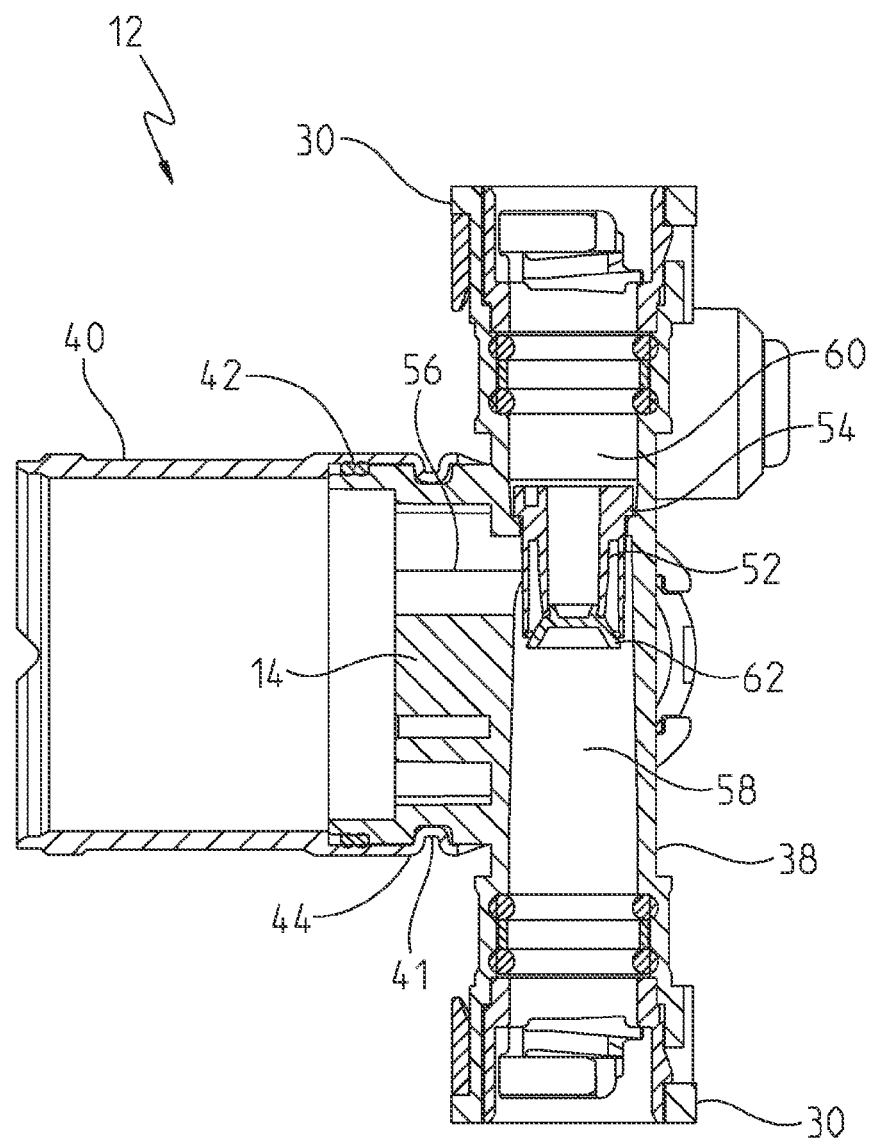
FIG. 4 is a cross-sectional side view of the valve body assembly of FIG. 3.

Referring next to FIGS. 3 and 4, an illustrative valve body 12 is shown. In the illustrated embodiment, valve body 12 includes a molded base 38. In one illustrative embodiment, molded base 38 is formed from a polymer, such as a thermoplastic or thermoset. In the illustrative embodiment, the use of moldable materials enables the geometry for a quick-connect type fitting 30 (see FIG. 2) to be formed as part of the valve body 12. More particularly, first, second, third, and fourth quick-connect type fittings 30 may be overmolded as an integral part of the base 38 of valve body 12.

In the illustrative embodiment shown in FIGS. 3 and 4, valve body 12 further includes a cartridge housing 40, and housing seal 42. In one illustrative embodiment, the cartridge housing 40 is formed from a copper alloy to provide strength for the threads for bonnet nut 16, burst pressure resistance, and corrosion resistance. In other embodiments, cartridge housing 40 is formed from other suitable materials.

Cartridge housing 40 is configured to encircle a portion of valve cartridge 14 and hold it in place in valve body 12. Mixing valve cartridge 14 is recessed within the cartridge housing 40 and in fluid communication with base 38 and, as such, terminal adapters 20, 22, 32, 34 through connection fittings 30. In one illustrative embodiment, cartridge housing 40 is axially retained to base 38 by cold forming a straight section (FIG. 3) of the cartridge housing 40 into a molded undercut 41 in the base 38 (FIG. 4). In other embodiments, other suitable ways of axially retaining cartridge housing 40 in molded base 38 may be used, including but not limited to providing an insert, overmolding the molded base 38 around the cartridge housing 40, and securing screws through the molded base 38 and into flanges or bosses in the cartridge housing 40.

Illustratively, molded base 38 includes fluid passageways connecting the terminal adapters 20, 22 to the mixing valve 14. This provides a fluid connection between hot and cold water supplies 25, 27 and mixing valve 14. In an illustrative embodiment, at least one of the fluid connections between the fluid passageways of molded base 38 and hot and cold supply lines 21, 23 includes a quick-connect fitting 30. Illustratively, molded base 38 also includes fluid passageways connecting the mixing valve 14 to terminal adapters 32, 34. This provides a fluid connection between mixing valve 14 and showerhead assembly 33 and tub spout assembly 35. In an illustrative embodiment, at least one of the fluid connections between the fluid passageways of molded base 38 and fluid outlet lines 37, 39 includes a quick-connect fitting 30.

In the illustrated embodiments shown in FIGS. 3 and 4, housing seal 42 is positioned between cartridge housing 40 and molded base 38 to prevent fluid from leaking through the connection. Housing seal 42 is illustrated in FIG. 3 as an elastomeric o-ring positioned between the cartridge housing 40 and molded base 38. In another embodiment, one or more o-rings or other sealing devices are used. A secondary seal 44 may be provided in the embodiment illustrated in FIG. 4 through interference between the cartridge housing 40 and base 38 at undercut 41 to further seal the connection between cartridge housing 40 and molded base 38.

Also illustrated in FIG. 3 are a plurality of threaded inserts 46 configured to accept screws for attaching trim, such as an escutcheon (not shown), to a pair of bosses or cylinders 96 of molded base 38. FIG. 3 further illustrates a pair of cylinders 94 for attaching molded base 38 to the plaster guard 18. Also illustrated in FIG. 3 are a pair of elastomeric bushings 48 and bushing supports 50 configured to accept screws (not shown) for mounting the valve body 12 to a support structure (not shown) in the wall, such as a wood stringer. In the illustrated embodiment, the bushings 48 act to isolate the supporting structure from vibration in the plumbing system at the valve body 12. The illustrated bushings 48 further act to absorb torsional loads applied to the valve body 12 through installation or removal of the bonnet nut 16, by the misalignment of tubes or pipes attached to the valve body 12, or other installation issues.

As shown in the illustrative embodiment of FIGS. 3 and 4, the valve body 12 is configured to accept an ejector assembly 52. In one embodiment, ejector assembly 52 is formed as a separate part and assembled into a bore 54 in the base. Referring to the illustrative embodiment shown in FIG. 4, fluid exiting the cartridge 14 through channel 56 impacts the ejector assembly 52, which directs the fluid downward through the lower outlet 58, which is fluidly connected to the tub adapter 34 through the lower quick-connect fitting 30. Tub adapter 34 is typically connected to a tub spout 35.

Figure 6:
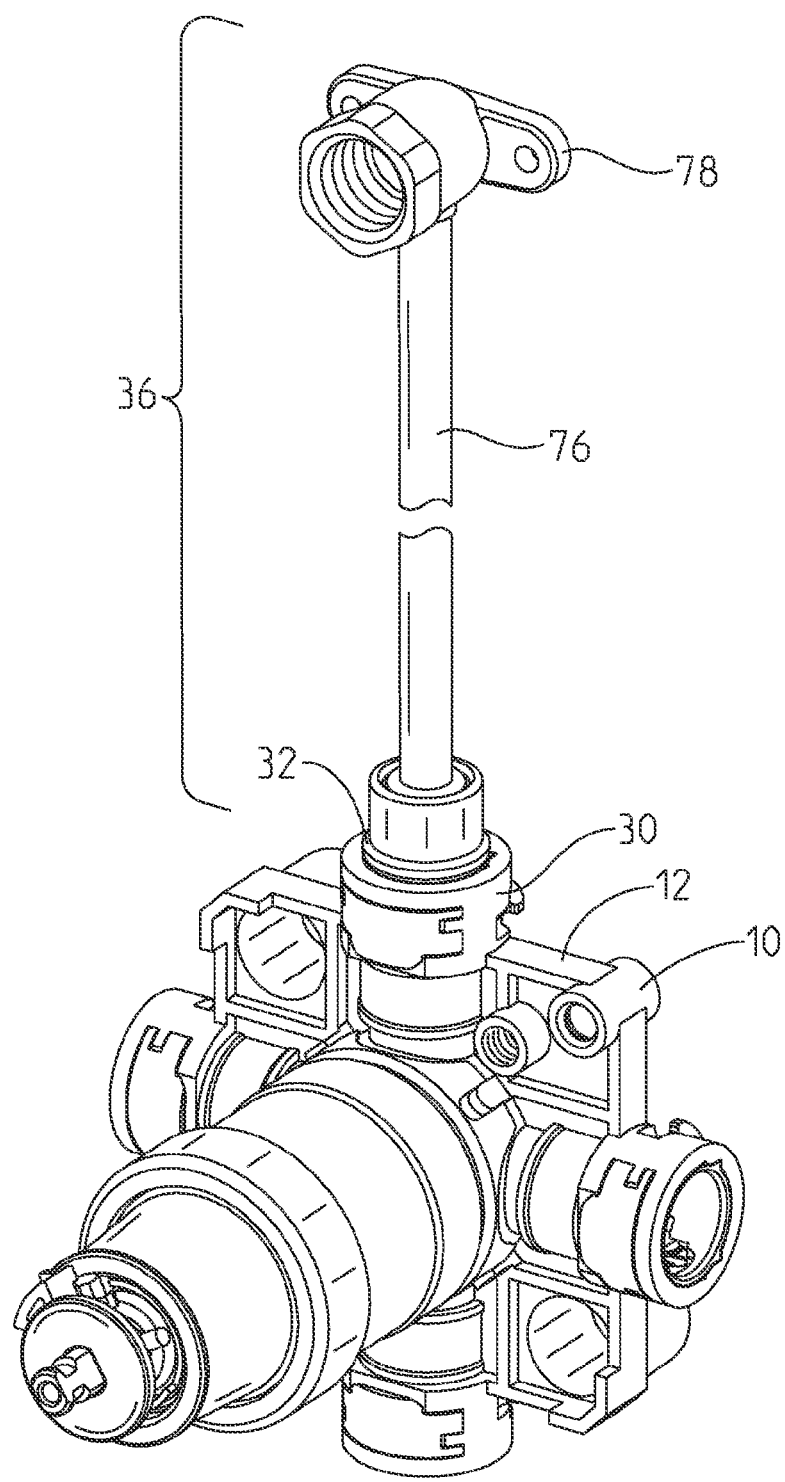
FIG. 6 is a perspective view of a shower riser assembly.

In an illustrative embodiment, a marginal seal is provided between the ejector assembly 52 and the bore 54 to prevent water from flooding the riser outlet 60. In the embodiment illustrated in FIG. 4, fluid flows out of the lower outlet 58 freely while air is drawn in through the riser outlet 60. If the lower outlet 58 is blocked, such as by a tub spout diverter (not shown), the fluid passes through a radial slot 62 in the ejector assembly 52, into the riser outlet 60, through the shower adapter 32 attached to the upper quick-connect fitting 30 and into the shower riser 36 (see. FIG. 6), and out through a connected device, such as a shower assembly 33. In one illustrative embodiment, the radial slot 62 is sized to prevent large pieces of debris from passing through that could clog or otherwise plug up the showerhead or other attached device. An illustrative ejector assembly is detailed in U.S. Pat. No. 8,210,203, the disclosure of which is expressly incorporated by reference herein.

Figure 5:
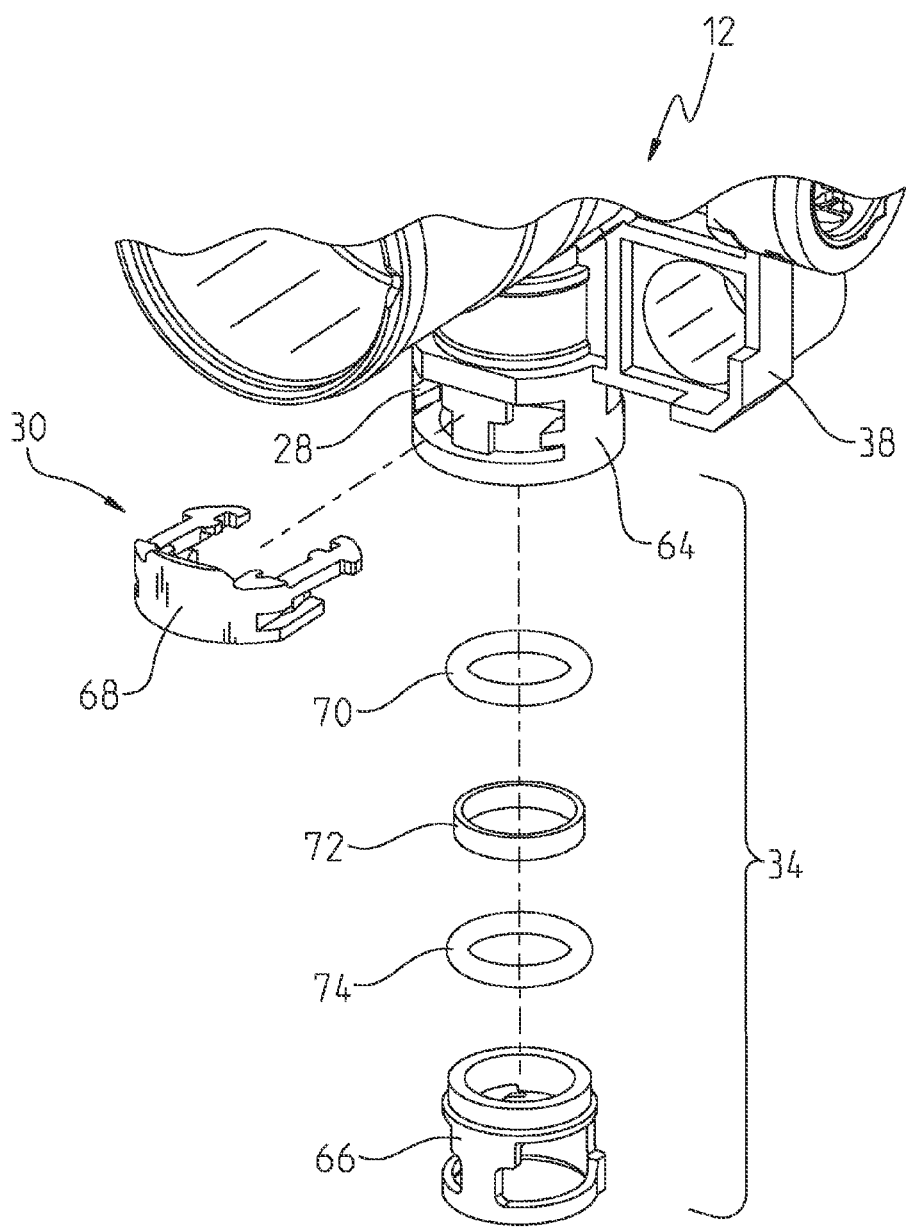
FIG. 5 is an exploded perspective view of a lower portion of the valve body assembly of FIG. 3.

Referring next to FIG. 5, an illustrative quick-connect fitting 30 is shown. In the illustrated embodiment, the quick-connect fitting 30 include a housing 64 attached to a quick-connect portion 28 of the molded base 38. A retention ring 66 attached to the adapter, such as adapters 20, 22, 32, and 34, is held in place in quick-connect fitting 30 by housing 64 and retention clip 68. As illustrated, quick-connect fitting 30 also includes a first o-ring 70, a back-up ring 72, and a second o-ring 74 to seal the connection. Another illustrative quick-connect fitting 130, similar to the SureConnect connector system (available from BrassCraft Mfg. Co, Novi Mich.), is shown in FIGS. 9-14. In other embodiments, the housing 64 and parts of the quick connect fitting 30 vary depending on the connector system for use therewith. Exemplary connector systems may include, but are not limited to, SureConnect and NGS (available from BrassCraft Mfg Co, Novi, Mich.), Push-to-Lock (available from Rayconnect Inc, Rochester Hills, Mich.), the Shark Bite Connection System (available from Reliance Worldwide Corporation, Birmingham, Ala.) or JG Speedfit (available from John Guest USA Inc, Fairfield, N.J.).

Figure 7:
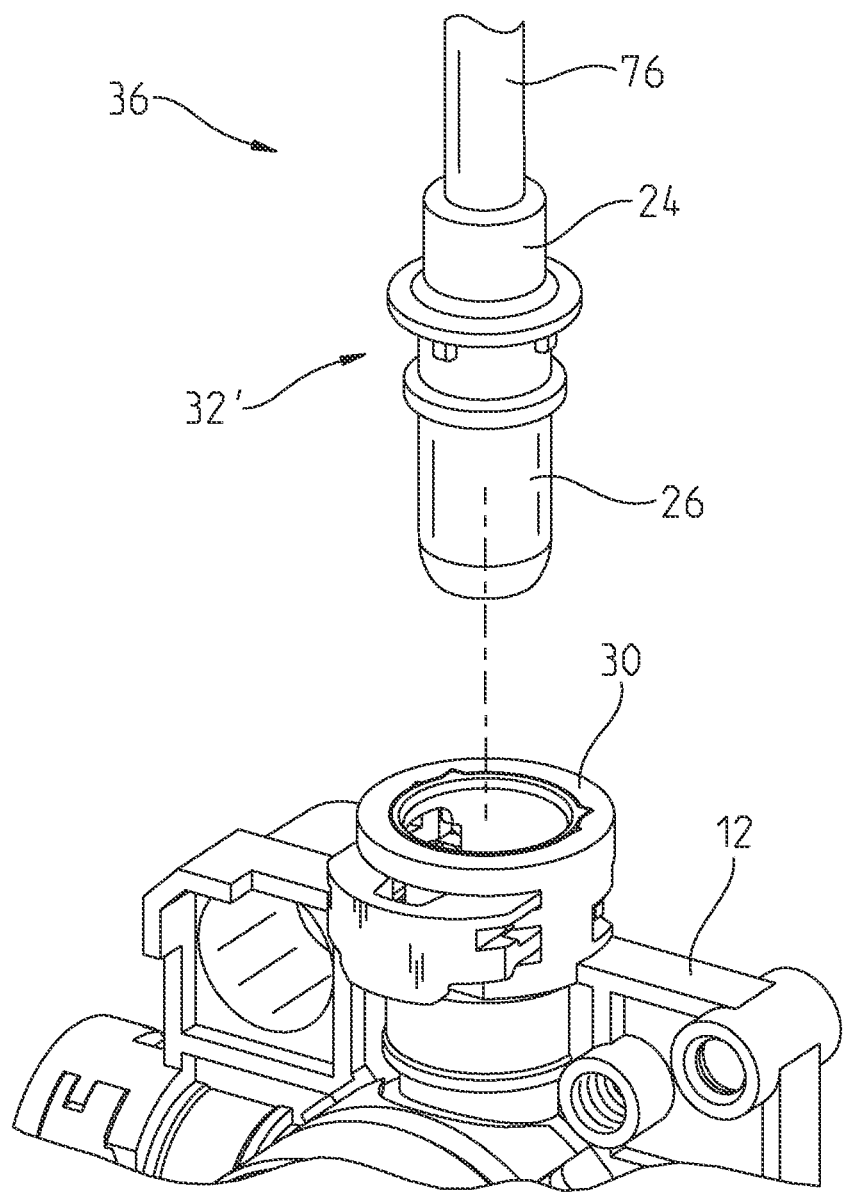
FIG. 7 is an exploded perspective view of a connection between the valve body assembly of FIG. 1 and the shower riser assembly of FIG. 6.
Figure 8:
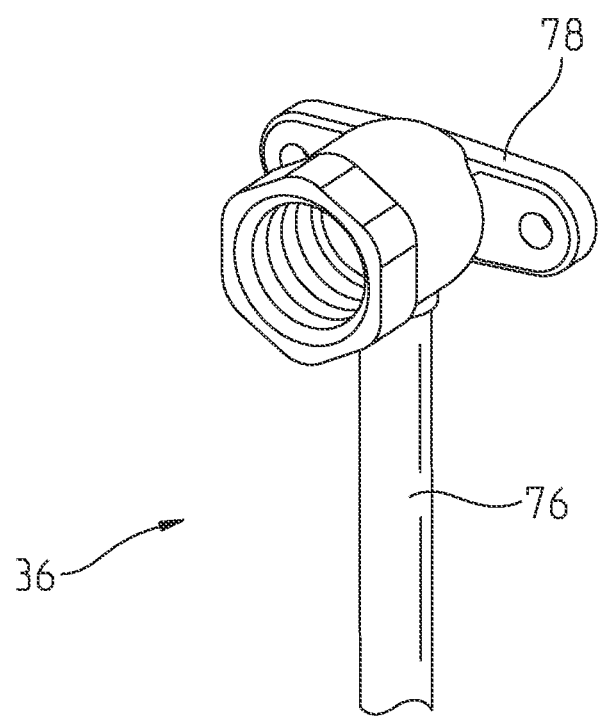
FIG. 8 is a perspective view of the upper portion of the shower riser assembly of FIG. 6.
Figure 9:
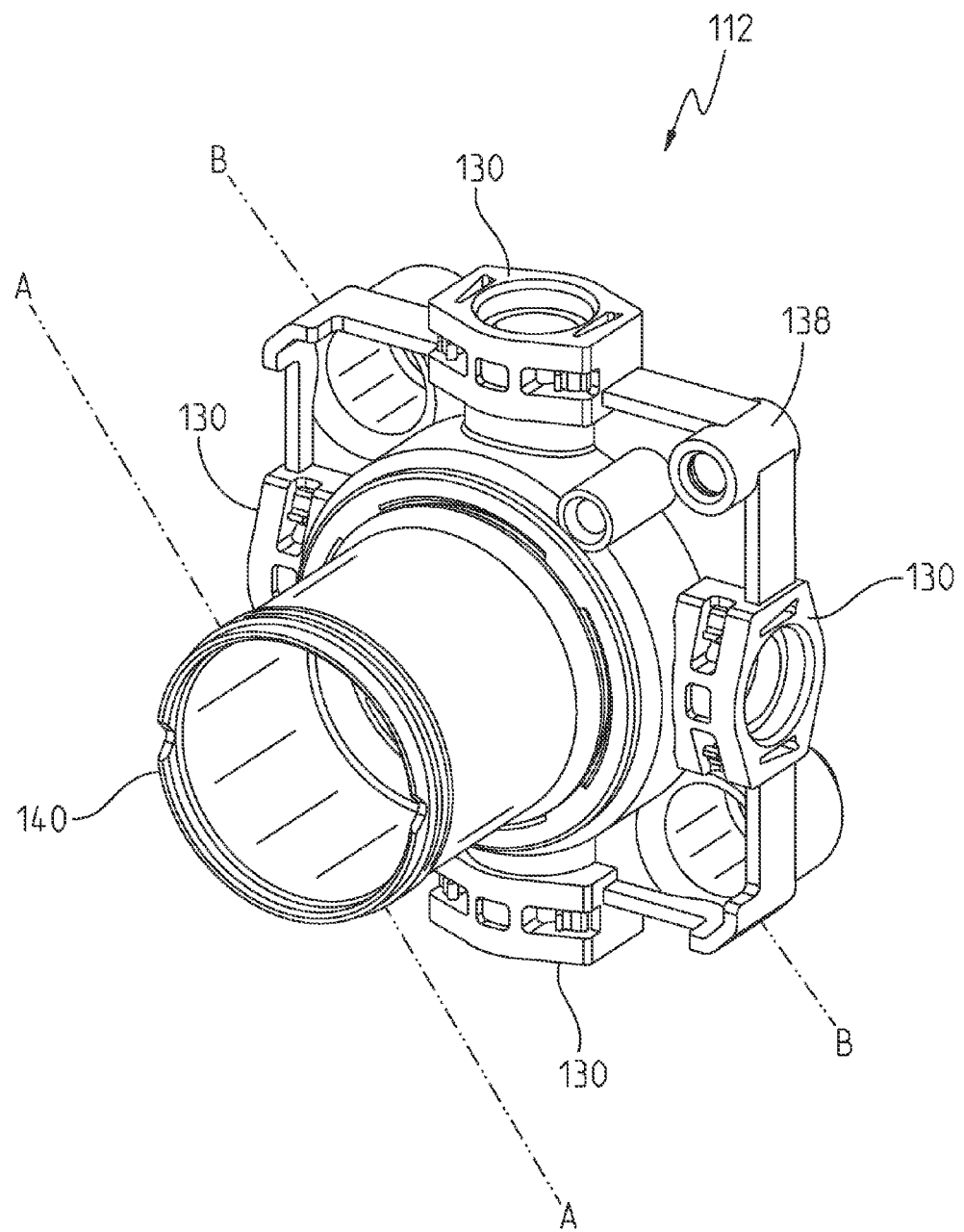
FIG. 9 is a perspective view of another valve body assembly.

Referring next to FIGS. 6-8, a shower riser 36 may be attached to illustrative valve body 12. In one illustrative embodiment, as shown in FIG. 6, the shower riser 36 is connected to an adapter 32 that is connected to a quick-connect fitting 30 of valve body 12. In an alternative embodiment, as illustrated in FIG. 7, the shower riser 36 includes a shower adapter end 32' having a quick-connect adapter end 26 configured to attach directly to quick-connect fitting 30 of valve body 12 and a connection end 24 attached to one end of a PEX tube 76. As illustrated in FIG. 8, the PEX tube 76 is attached to a drop-ear elbow 78 at the far end. A shower assembly 33 may be fluidly attached to the drop-ear elbow 78. Similar to the illustrative shower riser 36 shown in FIGS. 6-8, in an illustrative embodiment, a tub drop assembly (not shown) including a tub adapter 34 is included allowing a user to quickly fluidly attach the valve body 12 to a tub drop assembly 35.

Referring next to FIGS. 9-14, another illustrative shower valve body 112 for use with a shower valve system 10 is provided. Shower valve body 112 is similar to shower valve body 12 (see FIG. 3), but includes a bayonet-style connection between cartridge housing 140 and molded base 138. An exemplary bayonet-style connection can be found in U.S. Patent Application Publication No. 2011/0079307, the disclosure of which is expressly incorporated by reference herein.

Figure 10:
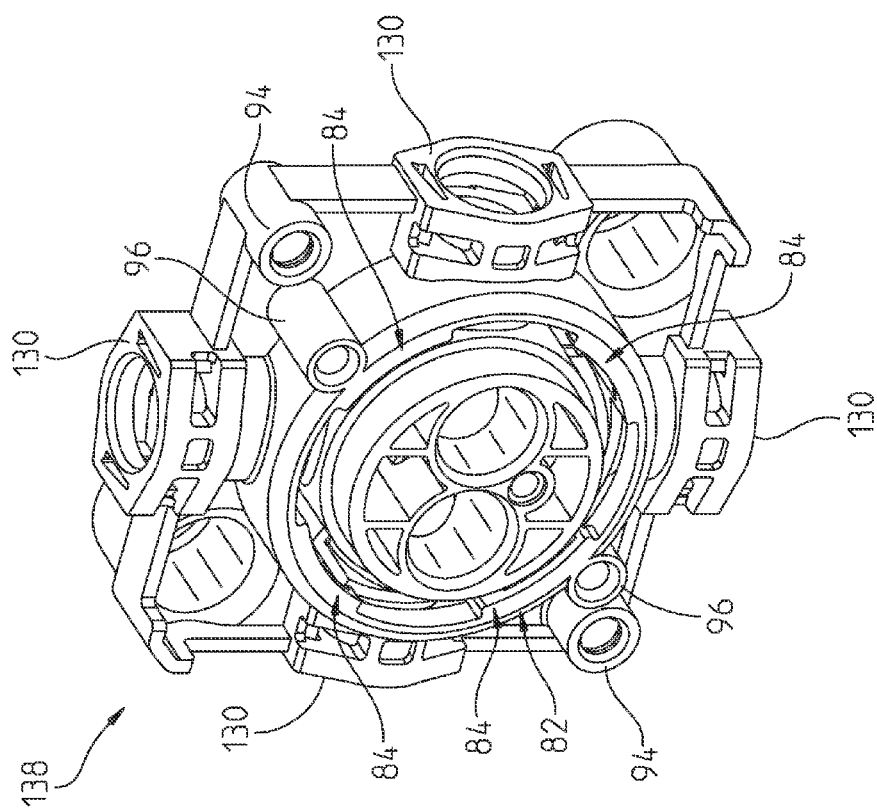
FIG. 10 is a perspective view of the valve body assembly of FIG. 9, with the cartridge housing removed.
Figure 10A:
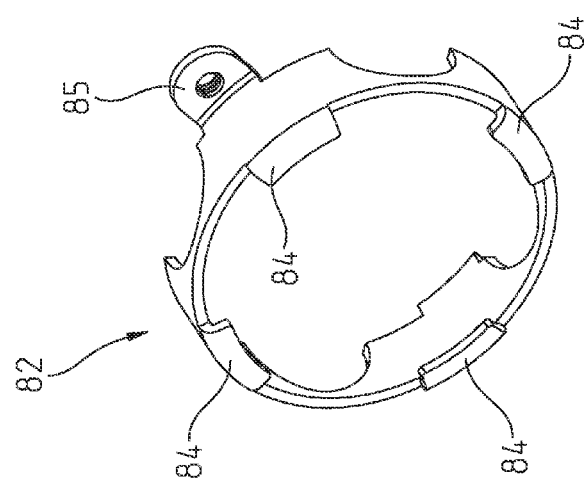
FIG. 10A is a perspective view of an insert of the valve body assembly of FIG. 10.

In the illustrative embodiment shown in FIG. 10, molded base 138 further includes an annular insert 82. FIG. 10A shows an illustrative insert 82, including circumferentially spaced insert tabs 84. Although the illustrated embodiment includes four insert tabs 84, more or fewer tabs may also be used. Exemplary materials for forming insert 82 include brass and stainless steel. In the illustrated embodiment, insert 82 further includes threaded holes 85 for receiving screws or other suitable fasteners to attach to an escutcheon (see FIG. 3).

FIG. 10 illustrates the molded base 138 including insert 82. In one illustrative embodiment, molded base 138 is formed from a polymer, such as a thermoplastic or thermoset, molded around insert 82. In one illustrative embodiment, molded base 138 is formed by overmolding a polymeric material around a stainless steel insert 82. In the illustrative embodiment, the use of moldable materials enables the geometry for a quick-connect type fitting 130 to be formed as part of the valve body 112. More particularly, at least a portion of first, second, third, and fourth quick-connect type fittings 130 may be overmolded as an integral part of the base 138 of valve body 112. In the illustrated embodiment, cylinders 94 and 96 are molded as part of molded base 138. Cylinders 96 may be positioned in alignment with the threaded holes 85 of insert 82 to allow the escutcheon (not shown) to be directly connected with the insert 82.

Illustratively, molded base 138 includes fluid passageways connecting the terminal adapters 20, 22 to the mixing valve 14 (see FIG. 1). This provides a fluid connection between hot and cold water supplies 25, 27 and mixing valve 14. In an illustrative embodiment, at least one of the fluid connections between the fluid passageways of molded base 138 and hot and cold supply lines 21, 23 includes a quick-connect fitting 130. Illustratively, molded base 138 also includes fluid passageways connecting the mixing valve 14 to terminal adapters 32, 34. This provides a fluid connection between mixing valve 14 and showerhead assembly 33 and tub spout assembly 35. In an illustrative embodiment, at least one of the fluid connections between the fluid passageways of molded base 138 and outlet lines 37, 39 includes a quick-connect fitting 130.

In the illustrative embodiment shown in FIGS. 11-14, valve body 112 further includes a cartridge housing 140, retaining ring 88, and housing seal 42. Also illustrated is threaded cartridge insert 97, which accepts the installation of valve cartridge 14 (see FIG. 2). Threaded cartridge insert 97 is illustratively made of brass, although other suitable materials may also be used. Cartridge housing 140 is similar to cartridge housing 40, but includes a plurality of circumferentially spaced housing tabs 86 and a housing groove 87. Although the illustrated embodiment includes four housing tabs 86, more or fewer tabs may also be used. In one embodiment, the number of housing tabs 86 is the same as the number of insert tabs 84 on insert 82. In the illustrated embodiment, housing groove 87 extends circumferentially within an outer surface of cartridge housing 140.

In an illustrative embodiment, retaining ring 88 includes a plurality of circumferentially spaced extending tabs 90 extending axially from retaining ring 88, and a plurality of circumferentially spaced snap tabs 92 extending radially from retaining ring 88. Extending tabs 90 extend axially from retaining ring 88 toward molded base 138. Snap tabs 92 extend towards the center of retaining ring 88 and are circumferentially spaced intermediate adjacent extending tabs 90. Retaining ring 88 is illustratively formed from a polymeric material, such as polybutylene terephthalate ("PBT"), polyoxymethylene ("POM") or other suitable plastic.

Figure 11:
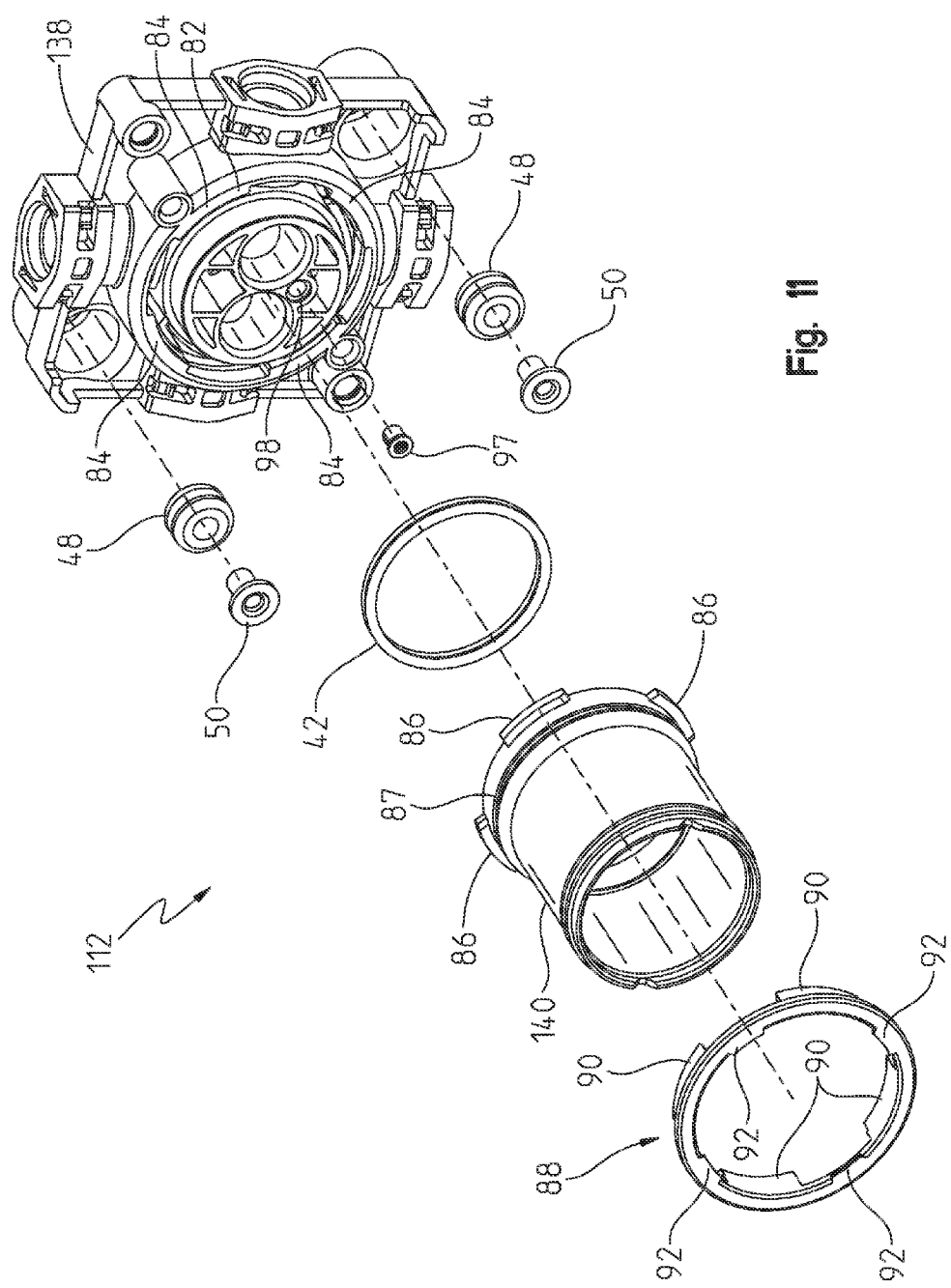
FIG. 11 is an exploded perspective view of a portion of the valve body assembly of FIG. 9 and a locking ring.
Figure 14:
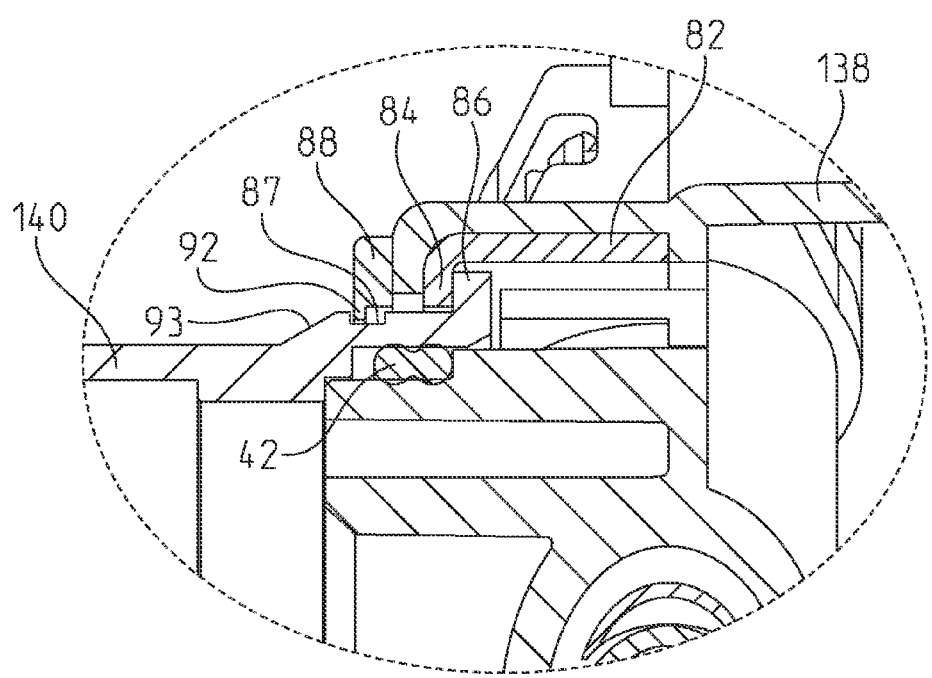
FIG. 14 is an enlarged view of a portion of FIG. 13.

Referring to FIG. 11, to install cartridge housing 140 into insert 82 of molded base 138, a seal 42 is positioned between cartridge housing 140 and molded base 138, and cartridge housing 140 is axially moved towards molded base 138 such that the housing tabs 86 are received between circumferentially adjacent insert tabs 84 of insert 82. The cartridge housing 140 is then rotated within insert 82 until housing tabs 86 are rotationally aligned behind insert tabs 84, as shown in FIG. 14. In the aligned position, insert tabs 84 cooperate with housing tabs 86 to prevent axial movement of the cartridge housing 140 relative to the insert 82 and base 138.

Figure 12:
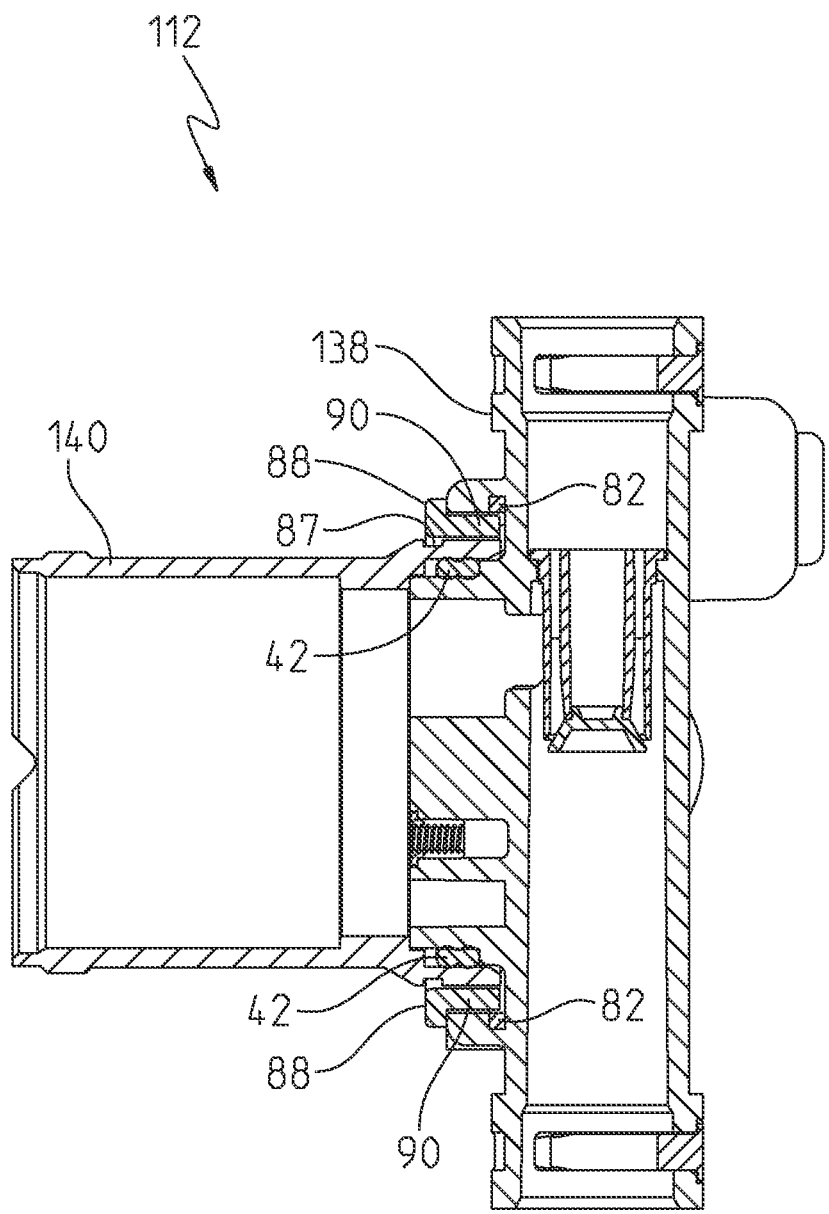
FIG. 12 is a cross-sectional side view of the valve body assembly of FIG. 9.

Referring again to FIG. 11, retaining ring 88 is positioned around cartridge housing 140 and moved axially along cartridge housing 140 towards the molded base 138 until extending tabs 90 are received in the spaces between the circumferentially spaced housing tabs 86 and aligned insert tabs 84. As shown in FIG. 12, extending tabs 90 are positioned in the spaces between the circumferentially spaced housing tabs 86, preventing the rotation of cartridge housing 140 within molded base 138 and maintaining the alignment of housing tabs 86 with insert tabs 84.

Figure 13:
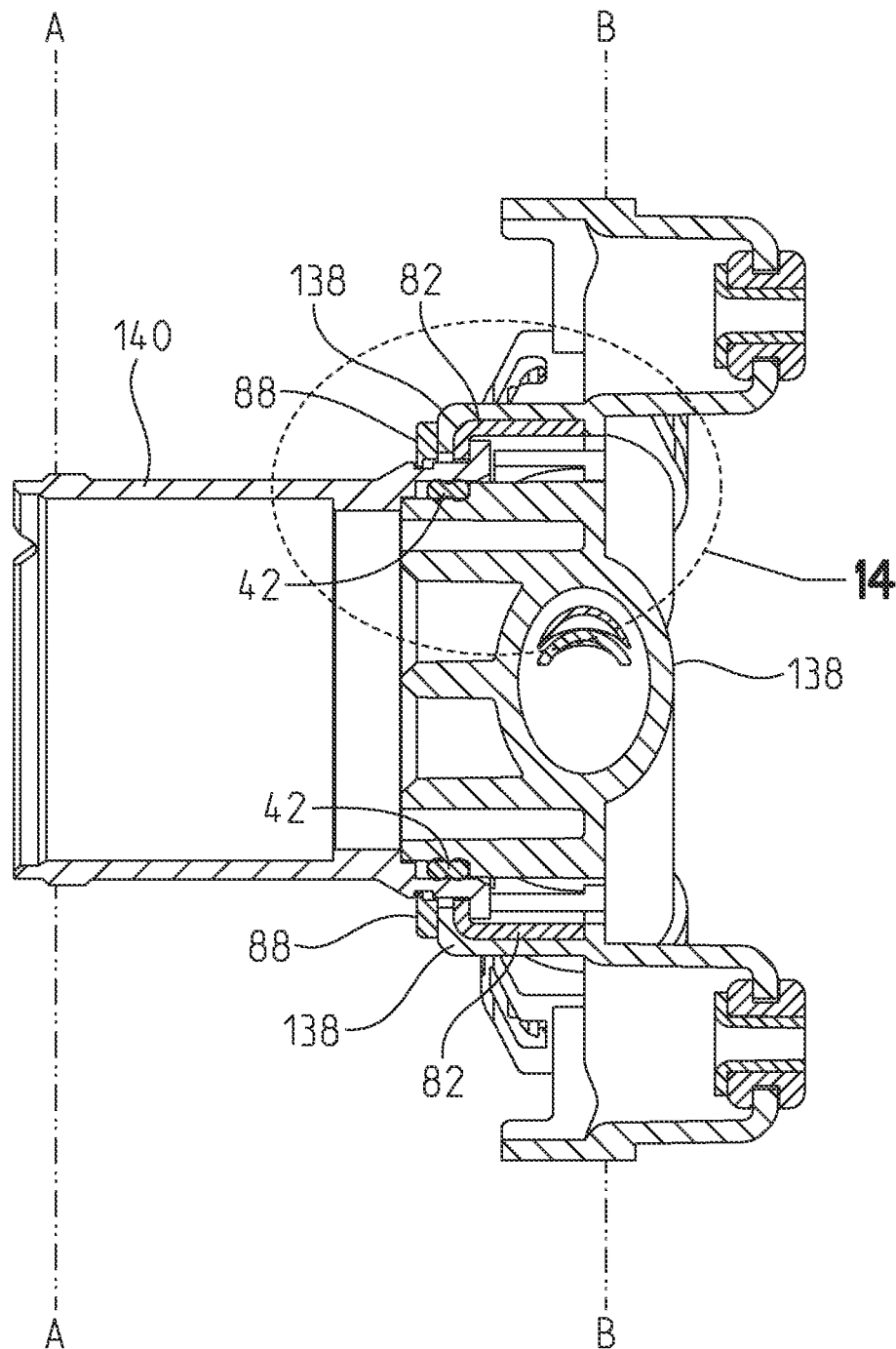
FIG. 13 is another cross-sectional view of the valve body assembly of FIG. 9 taken between the lines A-A and B-B.

As shown in FIGS. 13 and 14, retaining ring 88 is moved towards molded base 138 until snap tabs 92 extend over a lip 93 or protrusion of cartridge housing 140 and snap into housing groove 87. Once snap tabs 92 are received within housing groove 87, snap tabs 92 cooperate with the edges of housing groove 87 to resist axial movement of the retaining ring 88 relative to the cartridge housing.

Although the invention has been described in detail with reference to certain preferred embodiments, variations and modifications exist within the spirit and scope of the invention as described and defined in the following claims.

The invention claimed is:

1. A valve assembly for a shower/tub system comprising:
a valve body assembly including a molded base including a plurality of circumferentially spaced tabs, a valve cartridge housing coupled to the molded base, a first connection fitting molded with the base, a second connection fitting spaced from the first connection fitting and molded with the base, a third connection fitting spaced from the second fitting and molded with the base, and a fourth connection fitting spaced from the third connection fitting and molded with the base, wherein the plurality of circumferentially spaced tabs resist axial movement of the valve cartridge housing;
a first inlet terminal adapter configured to operably couple with the first connection fitting to provide fluid communication between a hot water supply source and the molded base;
a second inlet terminal adapter configured to operably couple with the second connection fitting to provide fluid communication between a cold water supply and the molded base;
a first outlet terminal adapter configured to operably couple with the third connection fitting to provide fluid communication between a shower fixture and the molded base; and
a second outlet terminal adapter configured to operably couple with the fourth connection fitting to provide fluid communication between a tub spout and the molded base.

2. The valve assembly of claim 1, wherein the base is molded from a polymer, and the valve cartridge housing is formed from a metal.

3. The valve assembly of claim 2, wherein a cold formed portion of the valve cartridge housing axially retains the valve cartridge housing to the molded base.

4. The valve assembly of claim 1, further comprising a mixing valve cartridge received within the valve cartridge housing and in fluid communication with the molded base.

5. The valve assembly of claim 1, wherein the molded base further comprises a molded portion molded around a metal insert, the valve cartridge housing coupled to the metal insert.

6. The valve assembly of claim 1, wherein the molded base is formed by insert molding a molded portion around a metal insert.

7. The valve assembly of claim 6, wherein the molded portion includes at least a portion of one or more quick-connect type fittings.

8. The valve assembly of claim 1, wherein at least one of the outlet terminal adapters includes a connection end molded from a thermoplastic or chlorinated polyvinyl chloride.

9. The valve assembly of claim 1, further comprising a housing seal positioned between the cartridge housing and the molded base.

10. The valve assembly of claim 1 further comprising a retaining ring, wherein the retaining ring cooperates with the molded base to resist axial and rotational movement of the valve cartridge housing.

11. The valve assembly of claim 10, wherein the retaining ring includes a plurality of axially extending tabs and a plurality of radially extending tabs, the axially extending tabs cooperating with a plurality of tabs on the insert to resist rotational movement of the cartridge housing, and the radially extending tabs cooperating with a plurality of tabs on the insert to resist axial movement of the cartridge housing.

12. A valve assembly comprising:
a valve body configured to be supported within a shower wall, the valve body including a first inlet, a second inlet, a first outlet, and a second outlet, wherein the first inlet is configured to be fluidly connected to a first fluid source and the second inlet is configured to be fluidly connected to a second fluid source, the first outlet is configured to be fluidly connected to a first outlet fixture and the second outlet is configured to be fluidly connected to a second outlet fixture, wherein the valve body includes a molded body overmolded around a metal insert, the molded body providing fluid passageways connecting the first and second inlets to the first and second outlets, a first inlet quick-connect fitting configured to accept a terminal adapter fluidly connected to the first fluid source, and a first outlet quick-connect fitting configured to accept a terminal adapter fluidly connected to the first outlet fixture;
a mixing valve at least partially supported by the valve body configured to combine fluid from the first inlet and second inlet prior to fluid exiting through at least one of the first or second outlets;
a valve cartridge housing operably coupled to the molded body and at least partially encircling the mixing valve; and
a retaining ring, the retaining ring cooperating with the molded body and the insert to resist axial and rotational movement of the cartridge housing.

13. The valve assembly of claim 12, further comprising a second inlet quick-connect fitting configured to accept a terminal adapter fluidly connected to the second fluid source, and a second outlet quick-connect fitting configured to accept a terminal adapter fluidly connected to the second outlet fixture.

14. The valve assembly of claim 12, wherein the valve body includes a valve cartridge housing operably coupled to the molded body.

15. The valve assembly of claim 12, wherein the quick-connect fitting comprises:
a housing attached to a quick-connection portion of the molded body; and
a retention ring attached to the terminal adapter and held in place by the housing and a retention clip.

16. The valve assembly of claim 12, wherein at least a portion of the quick-connect fitting is overmolded as an integral part of the molded body.

17. The valve assembly of claim 12, wherein the retaining ring includes a plurality of axially extending tabs and a plurality of radially extending tabs, the axially extending tabs cooperating with a plurality of tabs on the insert to resist rotational movement of the cartridge housing, and the radially extending tabs cooperating with a plurality of tabs on the insert to resist axial movement of the cartridge housing.

18. A shower/tub fluid delivery system comprising:
a showerhead;
a tub spout;
a valve body assembly fluidly connected to the showerhead and tub spout, a plurality of quick-connect fittings overmolded with the valve body assembly and defining a first fluid inlet, a second fluid inlet, a shower outlet, and a tub outlet;
a first terminal adapter coupled to a hot water supply line and configured to connect with the quick-connect fitting of the first fluid inlet;
a second terminal adapter coupled to a cold water supply line and configured to connect with the quick-connect fitting of the second fluid inlet;
a shower outlet terminal adapter coupled to the showerhead and configured to connect with the quick-connect fitting of the shower outlet;
a tub outlet terminal adapter coupled to the tub spout and configured to connect with the quick-connect fitting of the tub outlet; and
the valve body assembly supporting a cartridge configured to mix fluid from the first and second fluid inlets and a molded component providing fluid passageways connecting the showerhead and tub spout to the first and second fluid inlets.

19. A shower/tub fluid delivery system comprising:
a showerhead;
a tub spout;
a valve body assembly fluidly connected to the showerhead and the tub spout, a plurality of quick-connect fittings overmolded with the valve body assembly and defining a first fluid inlet and a second fluid inlet;
the valve body assembly supporting a cartridge configured to mix fluid from the first and second fluid inlets and a molded component providing fluid passageways connecting the showerhead and tub spout to the first and second fluid inlets; and
a retaining ring, wherein the valve body includes the molded component overmolded around a metal insert and the retaining ring cooperates with the molded component and the metal insert to resist axial and rotational movement of a cartridge housing at least partially encircling the cartridge.

20. The valve assembly of claim 19, wherein the retaining ring includes a plurality of axially extending tabs and a plurality of radially extending tabs, the axially extending tabs cooperating with a plurality of tabs on the insert to resist rotational movement of the cartridge housing, and the radially extending tabs cooperating with a plurality of tabs on the insert to resist axial movement of the cartridge housing.

21. A valve assembly comprising:
a valve body configured to be supported within a shower wall, the valve body including a first inlet, a second inlet, a first outlet, and a second outlet, wherein the first inlet is configured to be fluidly connected to a first fluid source and the second inlet is configured to be fluidly connected to a second fluid source, the first outlet is configured to be fluidly connected to a first outlet fixture and the second outlet is configured to be fluidly connected to a second outlet fixture;
a mixing valve cartridge at least partially supported by the valve body and configured to combine fluid from the first inlet and second inlet prior to fluid exiting through at least one of the first or second outlets;
wherein the valve body includes a base and a cartridge housing coupled to the base;
the base including a molded body formed of a polymer, the molded body providing fluid passageways connecting the first and second inlets to the first and second outlets, a first inlet quick-connect fitting configured to accept a terminal adapter fluidly connected to the first fluid source, and a first outlet quick-connect fitting configured to accept a terminal adapter fluidly connected to the first outlet fixture; and the cartridge housing is formed of a metal and receives the mixing valve cartridge.

22. The valve assembly of claim 21, further comprising a second inlet quick-connect fitting configured to accept a terminal adapter fluidly connected to the second fluid source, and a second outlet quick-connect fitting configured to accept a terminal adapter fluidly connected to the second outlet fixture.

23. The valve assembly of claim 21, wherein each quick-connect fitting comprises:

a housing attached to a quick-connection portion of the molded body; and a retention ring attached to the terminal adapter and held in place by the housing and a retention clip.

24. The valve assembly of claim 21, wherein at least a portion of each quick-connect fitting is overmolded as an integral part of the molded body.

* * * * *